United States Patent
Isebrand (10) Patent No.: US 10,422,702 B2
(45) Date of Patent: Sep. 24, 2019

(54) TOTAL AIR TEMPERATURE PROBE WITH REDUCED ICING SENSOR FLOW PASSAGE GEOMETRY

(71) Applicant: Rosemount Aerospace Inc., Burnsville, MN (US)

(72) Inventor: Scott D. Isebrand, Minneapolis, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 187 days.

(21) Appl. No.: 15/617,768

(22) Filed: Jun. 8, 2017

(65) Prior Publication Data

US 2018/0356293 A1  Dec. 13, 2018

(51) Int. Cl.
| | |
|---|---|
| G01K 13/00 | (2006.01) |
| G01K 1/00 | (2006.01) |
| G01K 7/00 | (2006.01) |
| G01K 1/08 | (2006.01) |
| G01K 13/02 | (2006.01) |

(52) U.S. Cl.
CPC ............ G01K 1/08 (2013.01); G01K 13/028 (2013.01); *G01K 2013/024* (2013.01)

(58) Field of Classification Search
USPC ..................... 374/147, 148, 138, 208, 163
See application file for complete search history.

(56) References Cited

U.S. PATENT DOCUMENTS

| | | | |
|---|---|---|---|
| 2,970,475 A | 2/1961 | Werner | |
| 5,302,026 A * | 4/1994 | Phillips | G01K 13/02 374/135 |
| 5,653,538 A | 8/1997 | Phillips | |
| 5,752,674 A | 5/1998 | Mears et al. | |
| 6,609,825 B2 | 8/2003 | Ice et al. | |
| 6,651,515 B2 | 11/2003 | Bernard | |
| 6,817,240 B2 | 11/2004 | Collot et al. | |
| 6,840,672 B2 | 1/2005 | Ice et al. | |
| 6,974,250 B2 * | 12/2005 | Severson | G01K 13/02 374/138 |
| 7,124,630 B2 | 10/2006 | Hanson et al. | |
| 7,150,560 B2 | 12/2006 | Hanson et al. | |
| 7,191,643 B2 | 3/2007 | Rasmussen et al. | |

(Continued)

FOREIGN PATENT DOCUMENTS

| | | |
|---|---|---|
| EP | 1992928 A2 | 11/2008 |
| EP | 2072981 A2 | 6/2009 |

(Continued)

OTHER PUBLICATIONS

Extended European Search Report for EP Application No. 18175038.1, dated Oct. 25, 2018, 7 Pages.

(Continued)

*Primary Examiner* — Mirellys Jagan
(74) *Attorney, Agent, or Firm* — Kinney & Lange, P.A.

(57) ABSTRACT

A total air temperature probe includes a housing defining a total air temperature sensor flow passage and a sensor assembly positioned within the total air temperature sensor flow passage. The sensor assembly includes an element flow tube, and a sensing element within the element flow tube. An upper portion of the element flow tube is an entrance including a plurality of protrusions that extend in an upstream direction.

20 Claims, 6 Drawing Sheets

(56) References Cited

U.S. PATENT DOCUMENTS

| | | |
|---|---|---|
| 7,357,572 B2 | 4/2008 | Benning et al. |
| 7,441,948 B2 | 10/2008 | Bernard et al. |
| 7,828,477 B2 | 11/2010 | Benning et al. |
| 7,854,548 B2 * | 12/2010 | Sandnas ............... G01K 13/028 374/109 |
| 8,104,955 B2 * | 1/2012 | Benning .............. G01K 13/028 374/135 |
| 8,157,440 B2 | 4/2012 | Kulczyk |
| 8,864,370 B2 | 10/2014 | Dijon et al. |
| 2003/0058919 A1 | 3/2003 | Ice et al. |
| 2005/0232332 A1 * | 10/2005 | Hanson .................. G01K 13/02 374/141 |
| 2006/0056489 A1 | 3/2006 | Bernard et al. |
| 2014/0169401 A1 * | 6/2014 | Schwie ................ G01K 13/028 374/100 |
| 2016/0102562 A1 | 4/2016 | Evans et al. |
| 2016/0238456 A1 | 8/2016 | Wigen |
| 2017/0227402 A1 | 8/2017 | Isebrand |
| 2017/0227404 A1 | 8/2017 | Herman et al. |

FOREIGN PATENT DOCUMENTS

| | | |
|---|---|---|
| EP | 2700925 A2 | 2/2014 |
| EP | 2930492 A2 | 10/2015 |
| WO | WO03050496 A2 | 6/2003 |

OTHER PUBLICATIONS

Extended European Search Report for EP Application No. 17155028.8, dated Jul. 17, 2017, 9 Pages.

\* cited by examiner

TOTAL AIR TEMPERATURE PROBE WITH REDUCED ICING SENSOR FLOW PASSAGE GEOMETRY

BACKGROUND

The present disclosure relates to sensors, and in particular, to total air temperature (TAT) probes.

TAT probes are mounted on aircraft to measure the total air temperature on the skin of the aircraft. More specifically, TAT probes cause the surrounding airflow to stagnate and then measure the temperature of the stagnated air. Often TAT probes operate in environmental conditions that may include rain, ice, ice crystals, and other particles. Such small particles can interfere with sensor passage flow and can accumulate on the sensor assembly of the TAT probe, which may result in erroneous TAT measurement.

SUMMARY

A total air temperature probe includes a housing defining a total air temperature sensor flow passage and a sensor assembly positioned within the total air temperature sensor flow passage. The sensor assembly includes an element flow tube, and a sensing element within the element flow tube. An upper portion of the element flow tube is an entrance including a plurality of protrusions that extend in an upstream direction.

A total air temperature probe includes a housing, including an inlet scoop and a total air temperature sensor flow passage downstream of the inlet scoop, and a sensor assembly positioned in the total air temperature sensor flow passage. The sensor assembly includes an annular element flow tube having an entrance comprising the upper portion of the element flow tube and a sensing element within the element flow tube and downstream of the entrance. The entrance has protrusions that form peaks and valleys around the entrance, the protrusions extending upstream into the total air temperature sensor flow passage.

A total air temperature probe includes a housing including an inlet scoop, an outlet, a total air temperature sensor flow passage downstream of the inlet scoop, and a flow separation bend between the inlet scoop and the total air temperature sensor flow passage. The total air temperature probe also includes a sensor assembly positioned in the total air temperature sensor flow passage. The sensor assembly includes an element flow tube having an entrance comprising the upper portion of the element flow tube, a sensing element within the element flow tube, and a flow liner positioned annularly around the element flow tube. The entrance of the element flow tube has protrusions extending upstream into the total air temperature sensor flow passage.

DETAILED DESCRIPTION

In general, the present disclosure is a total air temperature (TAT) probe that includes an element flow tube with an entrance having protrusions extending toward an airflow. The protrusions reduce substantial ice accretion on the entrance, decreasing TAT measurement errors. As a result, the TAT probe has improved functionality in severe icing conditions.

Figure 1A:
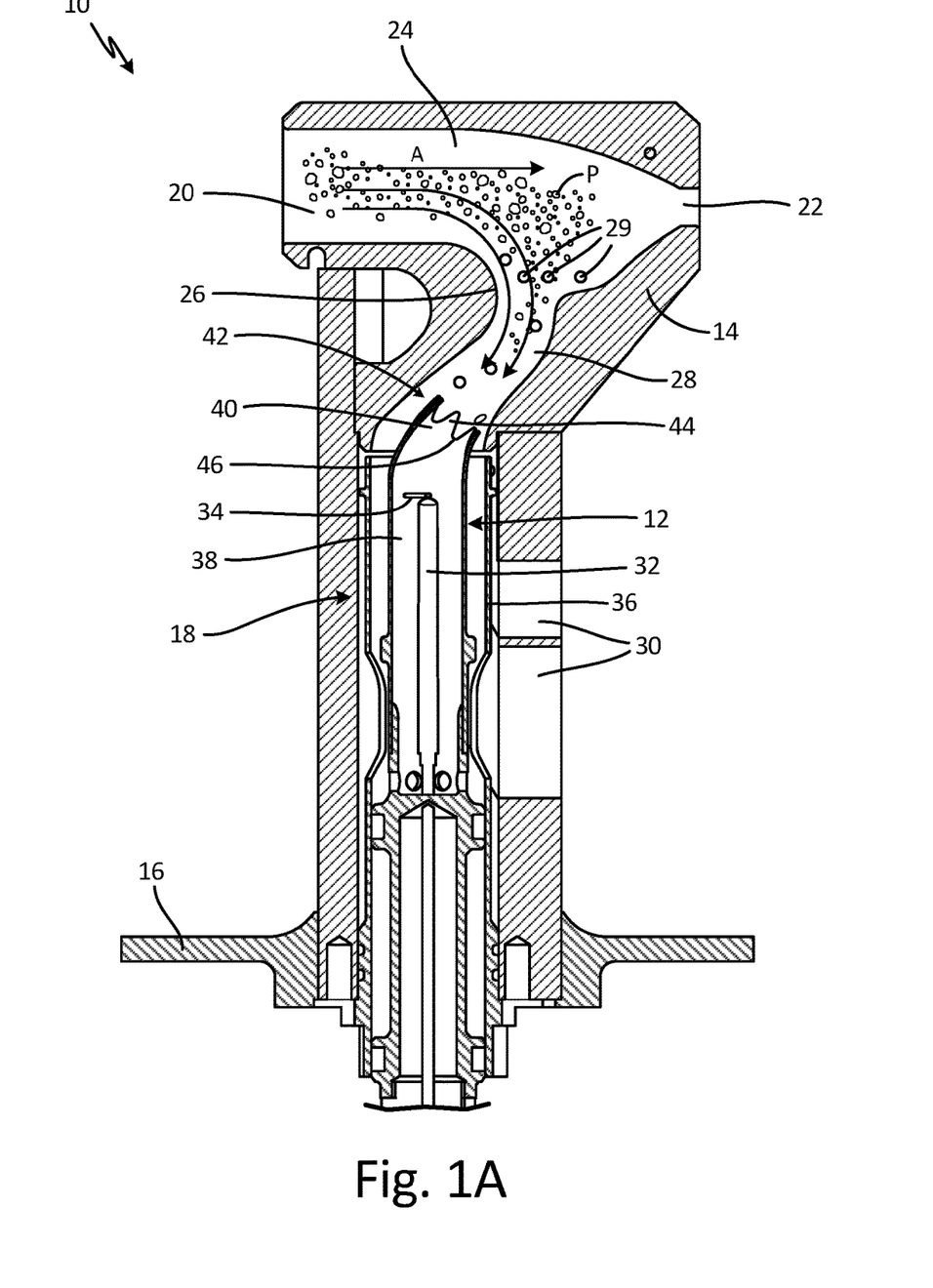
FIG. 1A is a cross-sectional view of a total air temperature (TAT) probe.
Figure 1B:
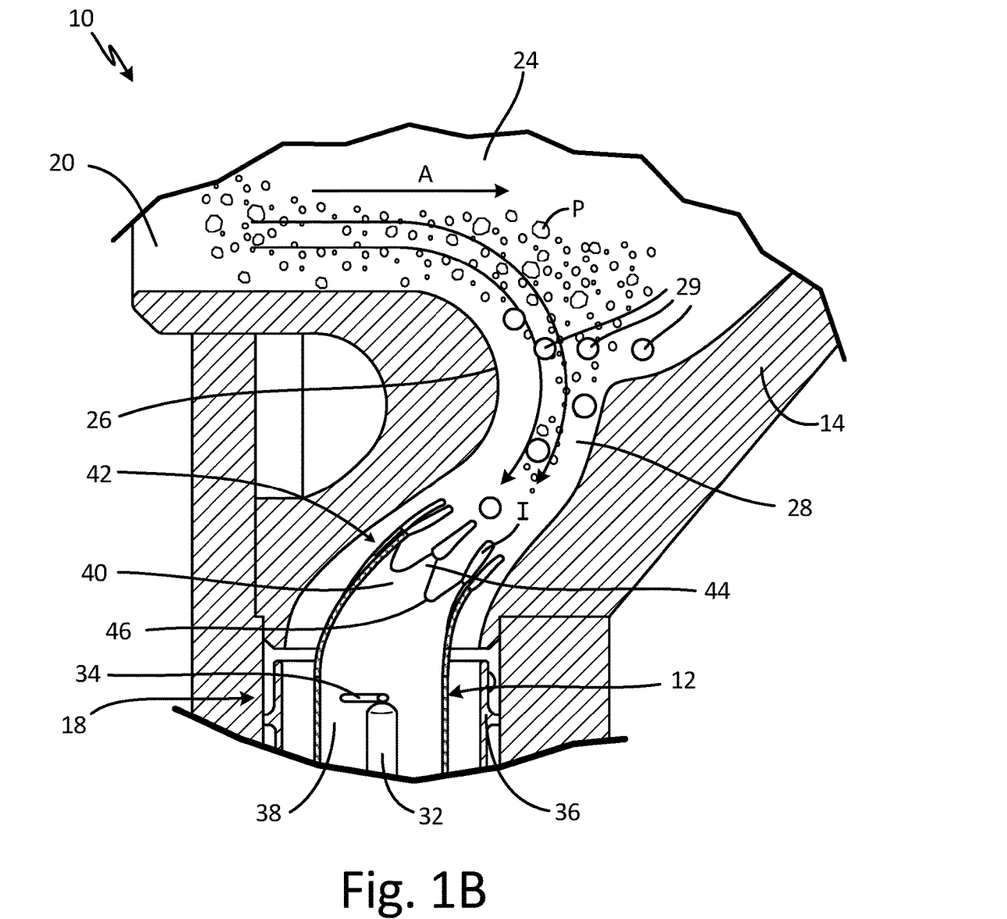
FIG. 1B is a partial enlarged cross-sectional view of the TAT probe showing ice accretion on an element flow tube.

FIG. 1A is a cross-sectional view of TAT probe 10. FIG. 1B is a partial enlarged cross-sectional view of TAT probe 10 showing accretion of ice I on element flow tube 12. TAT probe 10 includes housing 14, mounting flange 16 (shown in FIG. 1A), and sensor assembly 18. Housing 14 includes inlet scoop 20, outlet 22 (shown in FIG. 1A), main airflow passage 24, flow separation bend 26, TAT sensor flow passage 28, bleed holes 29, and exit ports 30 (shown in FIG. 1A). Sensor assembly 18 includes element flow tube 12, sensing elements 32, tip support 34, and flow liner 36. Element flow tube 12 includes main body 38 and entrance 40. Entrance 40 includes protrusions 42, which form peaks 44 and valleys 46 at entrance 40. Also shown in FIGS. 1A and 1B are airflow A, particles P, and ice I (shown in FIG. 1B).

TAT probe 10 has housing 14 attached to mounting flange 16. Housing 14 is heated and provides structure for TAT probe 10. Mounting flange 16 mounts TAT probe 10 to an aircraft. Sensor assembly 18 is positioned within housing 14.

Inlet scoop 20 is located near an outer end of housing 14 at a first side of housing 14. Outlet 22 is located near an outer end of housing 14 at a second side of housing 14. Main airflow passage 24 is a passageway within housing 14 that extends from inlet scoop 20 to outlet 22. Flow separation bend 26 is a curve in housing 14 between inlet scoop 20 and outlet 22 and adjacent main airflow passage 24 and TAT sensor flow passage 28. Flow separation bend 26 provides a curve of about 120 degrees between main airflow passage 24 and a first end of TAT sensor flow passage 28. In alternate embodiments, TAT probe 10 does not include flow separation bend 26. In such embodiments, a curve between main airflow passage 24 and the first end of TAT sensor flow passage 28 may be about 90 degrees. TAT sensor flow passage 28 is a passageway within housing 14 that has a first end positioned between inlet scoop 20 and outlet 22 and adjacent main airflow passage 24. The first end of TAT sensor flow passage 28 is curved along flow separation bend 26. In alternate embodiments, the first end of TAT sensor flow passage 28 may be straight. Further, in alternate embodiments, the first end of TAT sensor flow passage 28 may be perpendicular to main airflow passage 24. The second end of TAT sensor flow passage 28 extends into housing 14 toward mounting flange 16. TAT sensor flow passage 28 is in fluid communication with main airflow passage 24. Bleed holes 29 are passageways in housing 14 that extend from main airflow passage 24 or TAT sensor flow passage 28 through housing 14 to an exterior of housing 14. Exit ports 30 are passageways in housing 14 that extend from a second end of TAT sensor flow passage 28 through housing 14 to the exterior of housing 14. The passageways of exit ports 30 reach the exterior of housing 14 at the second side of housing 14.

Element flow tube 12 of sensor assembly 18 is annular and positioned within TAT sensor flow passage 28 around sensing elements 32. Sensing elements 32 are rod-like and located within element flow tube 12. Sensing elements 32 may be wire wound platinum resistance devices. Sensor assembly 18 has two sensing elements 32. In alternate embodiments, sensor assembly 18 has any number of sensing elements 32. Tip support 34 is connected to an inner surface of element flow tube 12 and extends toward and contacts upper ends of sensing elements 32. Flow liner 36 is an annular and positioned around element flow tube 12. As such, sensing elements 32, element flow tube 12, and flow liner 36 make up a concentric tubular assembly in TAT sensor flow passage 28. Sensor assembly 18, not including tip support 34, may be formed by additive manufacturing.

Element flow tube 12 has main body 38 with entrance 40 having a lower end connected to an upper end of main body 38. Main body 38 is positioned around sensing elements 32 within the second end of TAT sensor flow passage 28. Entrance 40 extends upstream from the upper end of main body 38, such that entrance 40 makes up an upper portion of element flow tube 12, and into the first end of TAT sensor flow passage 28. In this embodiment, TAT sensor flow passage 28 is curved and entrance 40 follows the curve of TAT sensor flow passage 28. In alternate embodiments, entrance 40 is not curved. Protrusions 42 are positioned along an upper end of entrance 40. In this embodiment, protrusions 42 are positioned or extend entirely around a circumference of entrance 40. In alternate embodiments, protrusions 42 extend around a portion of the circumference of entrance 40. Protrusions 42 extend upstream into TAT sensor flow passage 28 toward airflow A. In this embodiment, protrusions 42 extend upstream into TAT sensor flow passage 28 directly toward airflow A. Entrance 40 has at least two protrusions 42. Protrusions 42 may be any suitable shape. Element flow tube 12 may be one unitary piece. Alternatively, main body 38 and entrance 40 of element flow tube 12 may be separate pieces that are welded or brazed together. Element flow tube 12 may be formed by additive manufacturing.

Protrusions 42 form a series of alternating peaks 44 and valleys 46 around entrance 40. Peaks 44 may be any suitable shape, and in this embodiment, peaks 44 are tapered with flat tops. Valleys 46 may be any suitable shape, and in this embodiment, valleys 46 are curved. As a result, entrance 40 is serrated with protrusions forming curved valleys 46 and tapered truncated peaks 44.

Airflow A and particles P enter housing 14 of TAT probe 10 through inlet scoop 20. A portion of airflow A, along with a portion of particles P, flows through main airflow passage 24 and out of housing 14 through outlet 22. Another portion of airflow A, along with a lesser portion of particles P, flows partially through main airflow passage 24 and turns into TAT sensor flow passage 28 along flow separation bend 26. Airflow A curves along flow separation bend 26 as airflow A flows into and through the first end of TAT sensor flow passage 28. Some of airflow A in main airflow passage 24 and some of airflow A in TAT sensor flow passage 28 flows out of housing 14 through bleed holes 29. Airflow A remaining in TAT sensor flow passage 28 flows around and into sensor assembly 18. Airflow A flows through entrance 40 to reach sensing elements 32. Sensing elements 32 measure the total air temperature of airflow A that enters element flow tube 12. Airflow A exits the second end of TAT sensor flow passage 28 and housing 14 through exit ports 30.

Protrusions 42 at entrance 40 of element flow tube 12 extend into TAT sensor flow passage 28 and come into contact with airflow A and particles P. Particles P may be water, ice crystals, or other particles P in airflow A. Particles P can flow through TAT sensor flow passage 28 and accumulate on a top surface of entrance 40 of element flow tube 12 where particles P can freeze to form ice I. Accretion on entrance 40 tends to tends to grow toward impinging airflow A. Ice I can obstruct and alter sensor passage flow, resulting in temperature measurement errors.

Protrusions 42 decrease ice accretion on entrance 40 of element flow tube 12. Protrusions 42 reduce dimensions of entrance 40 on which particles P can accumulate. Rather than accreting as a larger and stronger tubular shape, ice accretes on tops of protrusions 42 of entrance 40 as smaller, slender rod-like growths. Such growths of ice I break off and shed at a higher rate than larger tubular growths that may form on an entrance not including protrusions 42. Consequently, growths of ice I shed from protrusions 42 before substantial flow disruption occurs. As a result, accretion of ice I does not adversely affect TAT measurement of TAT probe 10, allowing TAT probe 10 to function better in severe icing conditions.

Figure 2:
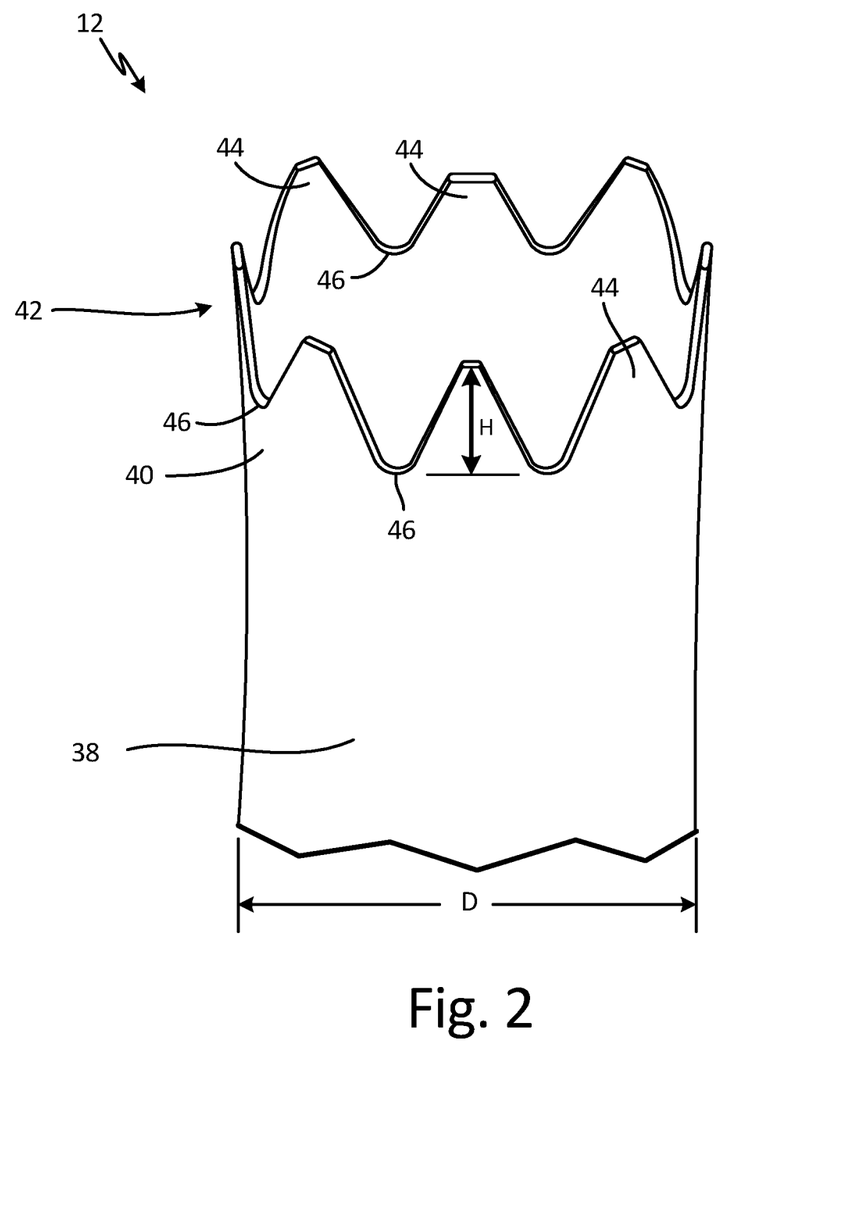
FIG. 2 is a partial perspective view of the element flow tube having protrusions forming tapered truncated peaks and curved valleys.

FIG. 2 is a partial perspective view of element flow tube 12 having protrusions 42 forming tapered truncated peaks 44 and curved valleys 46. Element flow tube 12 includes main body 38, entrance 40, and protrusions 42 that form peaks 44 and valleys 46. Also shown in FIG. 2 is diameter D and height H.

An upper end of main body 38 is connected to a lower end of entrance 40, such that entrance 40 makes up an upper portion of element flow tube 12. Protrusions 42 are positioned along an upper end of entrance 40 such that protrusions 42 extend around the entire circumference of entrance 40. In alternate embodiments, protrusions 42 extend around a portion of the circumference of entrance 40. Entrance 40 has at least two protrusions 42. Diameter D is a diameter of element flow tube 12.

Protrusions 42 have height H, which is a distance between a top of a peak 44 and a bottom of a valley 46, or the peak-to-valley amplitude. A ratio of diameter D to height H is between about two and about six.

Figure 3:
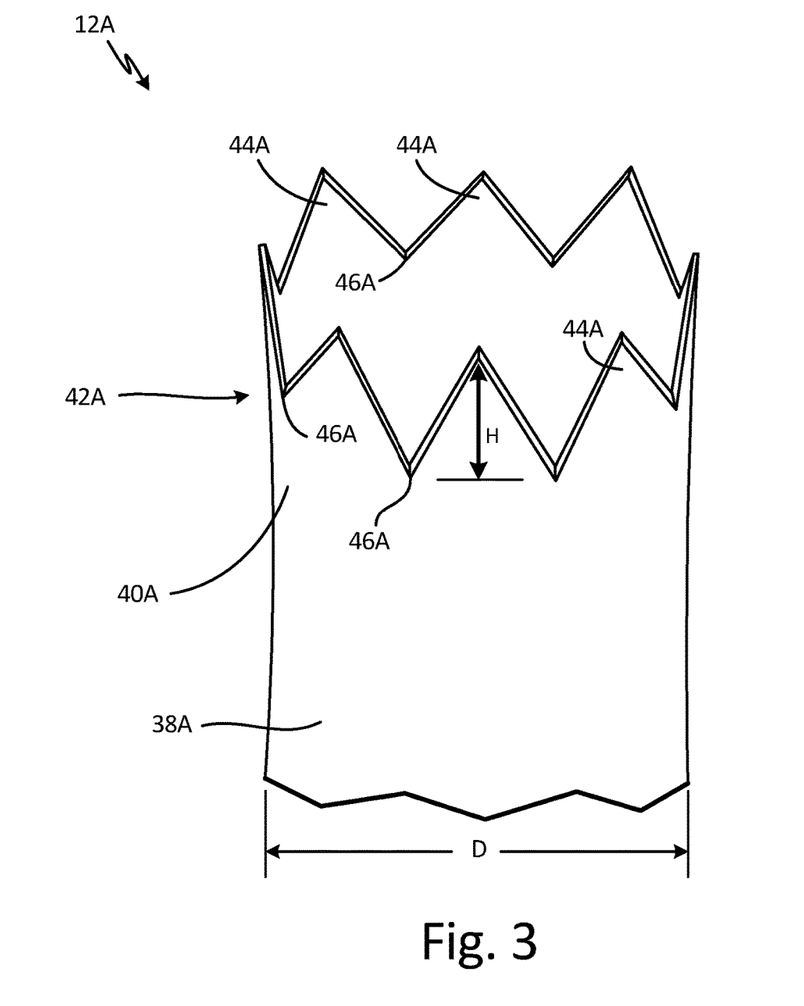
FIG. 3 is a partial perspective view of an embodiment of the element flow tube having triangular shaped protrusions.

FIG. 3 is a partial perspective view of an embodiment of element flow tube 12A having triangular shaped protrusions. Element flow tube 12A includes main body 38A, entrance 40A, and protrusions 42A that form peaks 44A and valleys 46A. Also shown in FIG. 3 is diameter D and height H.

An upper end of main body 38A is connected to a lower end of entrance 40A, such that entrance 40A makes up an upper portion of element flow tube 12A. Protrusions 42A are positioned along an upper end of entrance 40A such that protrusions 42A extend around an entire circumference of entrance 40A. In alternate embodiments, protrusions 42A extend around a portion of the circumference of entrance 40A. Entrance 40A has at least two protrusions 42A. Diameter D is a diameter of element flow tube 12A.

Protrusions 42A form a series of alternating peaks 44A and valleys 46A around entrance 40A. Peaks 44A may be any suitable shape, and in this embodiment, peaks 44A are triangular or V-shaped. Valleys 46A may be any suitable shape, and in this embodiment, valleys 46A are triangular or V-shaped. As a result, entrance 40A is serrated with triangular shaped protrusions 42A. Protrusions 42A have height H, which is a distance between a top of a peak 44A and a bottom of a valley 46A, or the peak-to-valley amplitude. A ratio of diameter D to height H is between about two and about six.

Figure 4:
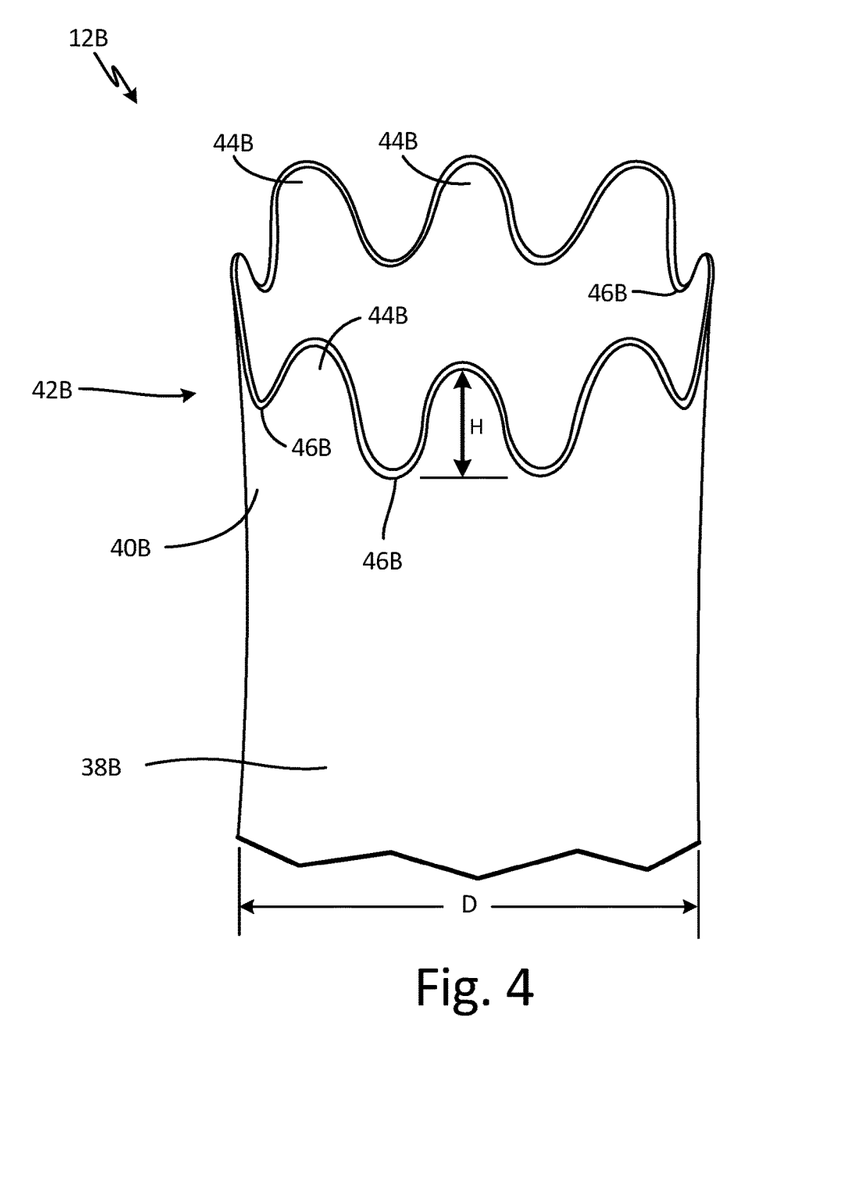
FIG. 4 a partial perspective view of an embodiment of the element flow tube having sinusoidal shaped protrusions.

FIG. 4 a partial perspective view of an embodiment of element flow tube 12B having sinusoidal shaped protrusions. Element flow tube 12B includes main body 38B, entrance 40B, and protrusions 42B that form peaks 44B and valleys 46B. Also shown in FIG. 4 is diameter D and height H.

An upper end of main body 38B is connected to a lower end of entrance 40B, such that entrance 40B makes up an upper portion of element flow tube 12B. Protrusions 42B are positioned along an upper end of entrance 40B such that protrusions 42B extend around a circumference of entrance 40B. In alternate embodiments, protrusions 42B extend around a portion of the circumference of entrance 40B. Entrance 40B has at least two protrusions 42B. Diameter D is a diameter of element flow tube 12B.

Protrusions 42B form a series of alternating peaks 44B and valleys 46B around entrance 40B. Peaks 44B may be any suitable shape, and in this embodiment, peaks 44B are sinusoidal or curved. Valleys 46B may be any suitable shape, and in this embodiment, valleys 46B are sinusoidal or curved. As a result, entrance 40B is scalloped with sinusoidal or curved protrusions 42B. Protrusions 42B have height H, which is a distance between a top of a peak 44B and a bottom of a valley 46B, or the peak-to-valley amplitude. A ratio of diameter D to height H is between about two and about six.

Figure 5:
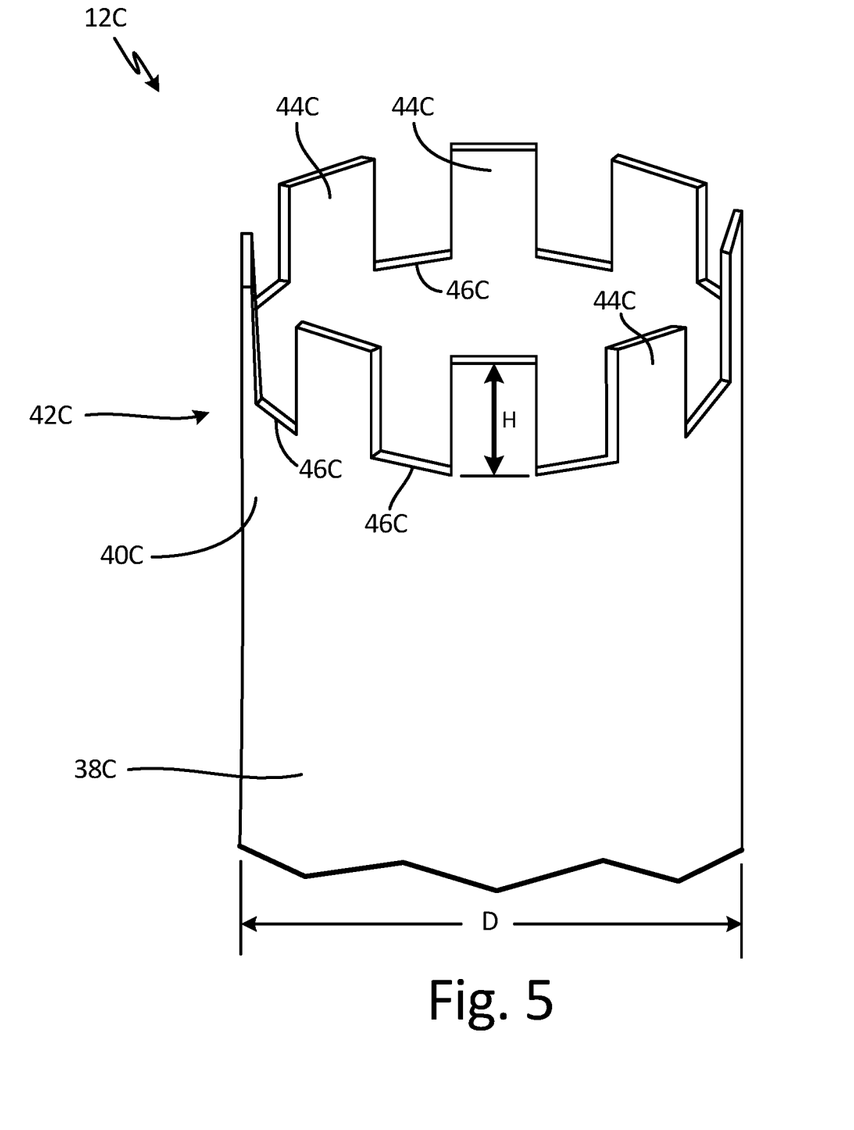
FIG. 5 a partial perspective view of an embodiment of the element flow tube having rectangular shaped protrusions.

FIG. 5 a partial perspective view of an embodiment of element flow tube 12C having rectangular shaped protrusions. Element flow tube 12C includes main body 38C, entrance 40C, and protrusions 42C that form peaks 44C and valleys 46C. Also shown in FIG. 5 is diameter D and height H.

An upper end of main body 38C is connected to a lower end of entrance 40C, such that entrance 40C makes up an upper portion of element flow tube 12C. Protrusions 42C are positioned along an upper end of entrance 40C such that protrusions 42C extend around a circumference of entrance 40C. In alternate embodiments, protrusions 42C extend around a portion of the circumference of entrance 40C. Entrance 40C has at least two protrusions 42C. Diameter D is a diameter of element flow tube 12C.

Protrusions 42C form a series of alternating peaks 44C and valleys 46C around entrance 40C. Peaks 44C may be any suitable shape, and in this embodiment, peaks 44C are rectangular shaped. Valleys 46C may be any suitable shape, and in this embodiment, valleys 46C are rectangular shaped. As a result, entrance 40C is castellated or crenellated with rectangular shaped protrusions 42C. Protrusions 42C have height H, which is a distance between a top of a peak 44C and a bottom of a valley 46C, or the peak-to-valley amplitude. A ratio of diameter D to height H is between about two and about six.

FIGS. 2, 3, 4, and 5 show embodiments of element flow tube 12 illustrating different forms protrusions 42 can take. Each of these embodiments function in a similar way and provide the same advantages or benefits as discussed in reference to FIGS. 1A and 1B.

Discussion of Possible Embodiments

The following are non-exclusive descriptions of possible embodiments of the present invention.

A total air temperature probe including a housing defining a total air temperature sensor flow passage; and a sensor assembly positioned within the total air temperature sensor flow passage, the sensor assembly including: an element flow tube, wherein an upper portion of the element flow tube is an entrance including a plurality of protrusions that extend in an upstream direction; and a sensing element within the element flow tube.

The total air temperature probe of the preceding paragraph can optionally include, additionally and/or alternatively, any one or more of the following features, configurations and/or additional components:

The plurality of protrusions form a plurality of peaks and a plurality of valleys.

The protrusions are triangular shaped.

The protrusions are curved.

The protrusions are rectangular-shaped.

The protrusions are tapered and truncated.

A ratio of a diameter of the element flow tube to a peak-to-valley height of the protrusions is between about two and about six.

The sensor assembly further comprises a flow liner positioned annularly around the element flow tube and the entrance of the element flow tube is shaped to extend into the total air temperature sensor flow passage toward an inlet scoop in the housing and beyond an upper portion of the flow liner.

The entrance is curved to extend upstream into a curved total air temperature sensor flow passage.

The protrusions are configured to decrease ice accretion on the entrance of the element flow tube.

The sensing element is configured to measure total air temperature.

A total air temperature probe including a housing including: an inlet scoop; and a total air temperature sensor flow passage downstream of the inlet scoop; and a sensor assembly positioned in the total air temperature sensor flow passage, the sensor assembly including: an annular element flow tube having an entrance comprising the upper portion of the element flow tube; and a sensing element within the element flow tube and downstream of the entrance; wherein the entrance has protrusions that form peaks and valleys around the entrance, the protrusions extending upstream into the total air temperature sensor flow passage.

The total air temperature probe of the preceding paragraph can optionally include, additionally and/or alternatively, any one or more of the following features, configurations and/or additional components:

A ratio of a diameter of the element flow tube to a peak-to-valley height of the protrusions is between about two and about six.

The protrusions have a shape selected from the group consisting of: a triangular shape, a curved shape, a rectangular shape, and a tapered shape with a truncated edge.

Protrusions extend entirely around a circumference of the entrance.

A total air temperature probe including a housing including: an inlet scoop; an outlet; a total air temperature sensor flow passage downstream of the inlet scoop; and a flow separation bend downstream of the inlet and adjacent the total air temperature sensor flow passage; and a sensor assembly positioned in the total air temperature sensor flow passage, the sensor assembly including: an element flow tube having an entrance comprising the upper portion of the element flow tube; a sensing element within the element flow tube; and a flow liner positioned annularly around the element flow tube; wherein the entrance of the element flow tube has protrusions extending upstream into the total air temperature sensor flow passage.

The total air temperature probe of the preceding paragraph can optionally include, additionally and/or alternatively, any one or more of the following features, configurations and/or additional components:

The protrusions form a plurality of peaks and a plurality of valleys.

A ratio of a diameter of the element flow tube to a peak-to-valley height of the protrusions is between about two and about six.

The protrusions have a shape selected from the group consisting of: a triangular shape, a curved shape, a rectangular shape, and a tapered shape with a truncated edge.

Protrusions extend entirely around a circumference of the entrance.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A total air temperature probe comprising:
    a housing defining a total air temperature sensor flow passage; and
    a sensor assembly positioned within the total air temperature sensor flow passage,
        the sensor assembly including:
            an element flow tube, wherein an upper portion of the element flow tube is an entrance including a plurality of protrusions that extend in an upstream direction; and
            a sensing element within the element flow tube.

2. The total air temperature probe of claim 1, wherein the sensor assembly further comprises a flow liner positioned annularly around the element flow tube and the entrance of the element flow tube is shaped to extend into the total air temperature sensor flow passage toward an inlet scoop in the housing and beyond an upper portion of the flow liner.

3. The total air temperature probe of claim 1, wherein the entrance is curved to extend upstream into a curved total air temperature sensor flow passage.

4. The total air temperature probe of claim 1, wherein the protrusions are configured to decrease ice accretion on the entrance of the element flow tube.

5. The total air temperature probe of claim 1, wherein the sensing element is configured to measure total air temperature.

6. The total air temperature probe of claim 1, wherein the plurality of protrusions form a plurality of peaks and a plurality of valleys.

7. The total air temperature probe of claim 6, wherein the protrusions are triangular shaped.

8. The total air temperature probe of claim 6, wherein the protrusions are curved.

9. The total air temperature probe of claim 6, wherein the protrusions are rectangular shaped.

10. The total air temperature probe of claim 6, wherein the protrusions are tapered and truncated.

11. The total air temperature probe of claim 6, wherein a ratio of a diameter of the element flow tube to a peak-to-valley height of the protrusions is between about two and about six.

12. A total air temperature probe comprising:
    a housing including:
        an inlet scoop; and
        a total air temperature sensor flow passage downstream of the inlet scoop; and
    a sensor assembly positioned in the total air temperature sensor flow passage, the sensor assembly including:
        an annular element flow tube having an entrance comprising an upper portion of the element flow tube; and
        a sensing element within the element flow tube and downstream of the entrance;
    wherein the entrance has protrusions that form peaks and valleys around the entrance, the protrusions extending upstream into the total air temperature sensor flow passage.

13. The total air temperature probe of claim 12, wherein a ratio of a diameter of the element flow tube to a peak-to-valley height of the protrusions is between about two and about six.

14. The total air temperature probe of claim 12, wherein the protrusions have a shape selected from the group consisting of: a triangular shape, a curved shape, a rectangular shape, and a tapered shape with a truncated edge.

15. The total air temperature probe of claim 12, wherein protrusions extend entirely around a circumference of the entrance.

16. A total air temperature probe comprising:
    a housing including:
        an inlet scoop;
        an outlet;
        a total air temperature sensor flow passage downstream of the inlet scoop; and
        a flow separation bend downstream of the inlet scoop and adjacent the total air temperature sensor flow passage; and
    a sensor assembly positioned in the total air temperature sensor flow passage, the sensor assembly including:
        an element flow tube having an entrance comprising an upper portion of the element flow tube;
        a sensing element within the element flow tube; and
        a flow liner positioned annularly around the element flow tube;
    wherein the entrance of the element flow tube has protrusions extending upstream into the total air temperature sensor flow passage.

17. The total air temperature probe of claim 16, wherein the protrusions have a shape selected from the group consisting of: a triangular shape, a curved shape, a rectangular shape, and a tapered shape with a truncated edge.

18. The total air temperature probe of claim 16, wherein protrusions extend entirely around a circumference of the entrance.

19. The total air temperature probe of claim 16, wherein the protrusions form a plurality of peaks and a plurality of valleys.

20. The total air temperature probe of claim 19, wherein a ratio of a diameter of the element flow tube to a peak-to-valley height of the protrusions is between about two and about six.

* * * * *